Figure 1:
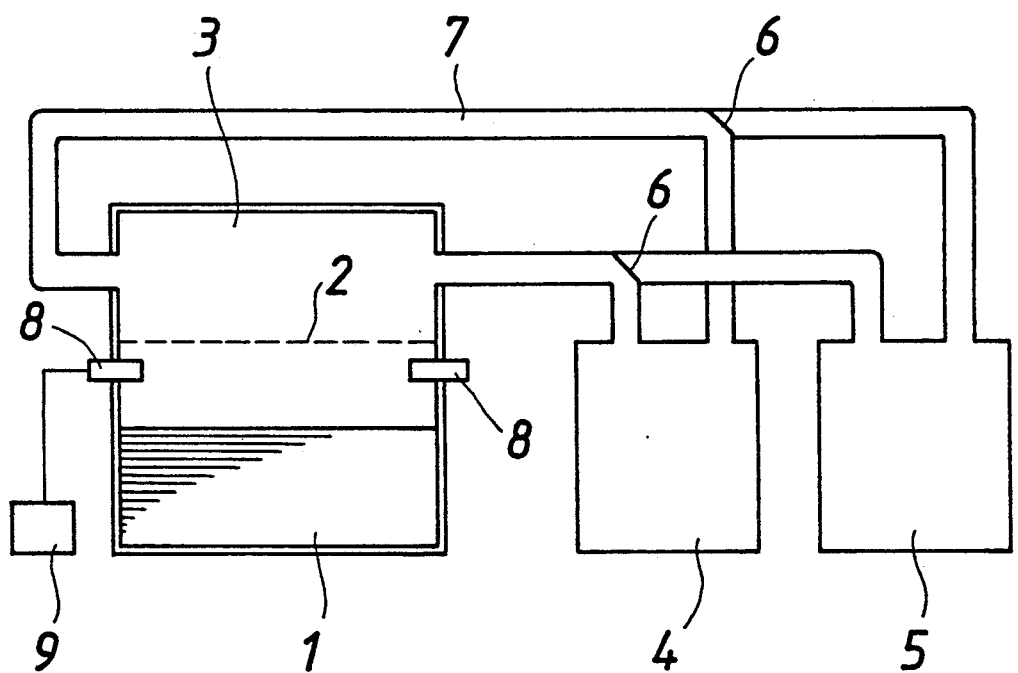

United States Patent [19]

Kotani et al.

[11] Patent Number: 5,110,860
[45] Date of Patent: May 5, 1992

[54] AGRICULTURAL FILM

[75] Inventors: Kozo Kotani, Toyonaka; Hideo Negawa, Shiga; Taiichi Sakaya, Ibaraki, all of Japan

[73] Assignee: Sumitomo Chemical Company, Limited, Osaka, Japan

[21] Appl. No.: 587,782

[22] Filed: Sep. 26, 1990

[30] Foreign Application Priority Data

Oct. 6, 1989 [JP] Japan .................................. 1-262715

[51] Int. Cl.$^5$ ............................................. C08L 31/02
[52] U.S. Cl. .................................... 524/563; 524/168; 524/169; 524/366; 524/376; 524/377; 524/570; 524/585
[58] Field of Search ............... 524/169, 168, 563, 585, 524/366, 376, 377, 570

[56] References Cited

FOREIGN PATENT DOCUMENTS 59-35573  8/1984  Japan .
1-216947  8/1989  Japan .
1-225651  9/1989  Japan .

Primary Examiner—Bernard Lipman
Assistant Examiner—J. M. Reddick
Attorney, Agent, or Firm—Wenderoth, Lind & Ponack

[57] ABSTRACT

The invention provides an agricultural film of a polyolefin composition from 0.02 to 0.5 part by weight of an ω-hydroperfluoroalkyl group-containing fluorine compound surfactant and from 0.5 to 5 parts by weight of a nonionic dripping agent per 100 parts by weight of a polyolefin resin. The agricultural film can prevent fog generation in houses, tunnels or the like in horticulture use facilities.

3 Claims, 1 Drawing Sheet

AGRICULTURAL FILM

The present invention relates to an agricultural film which can prevent fog generation in houses, tunnels or the like in horticulture use facilities.

As covering materials used in houses, tunnels or the like in horticulture use facilities, there have hitherto been mainly used polyvinyl chloride films and polyolefin films such as polyethylene films, ethylene-vinyl acetate copolymer films or the like.

In recent years, there has arisen a problem that in houses, tunnels or the like using these covering materials, the environment becomes high in moisture due to the control of cultivation of crops whereby fog generation occurs in the houses or tunnels.

Fog generation is a phenomenon which is seen to occur due to rapid change in the environment (e.g., temperature, moisture) inside and outside the house or tunnel and in particularly, it is likely found in the morning or evening when the temperature difference inside and outside the house or tunnel rapidly changes. Accordingly, fog generation is considered as an issue to be prevented to the utmost in view of an anxiety for blight to cultivated crops or a fear for quality reduction of harvests.

As to such fog generation, it is known that fog generation varies depending on the type of dripping agent used in the covering film.

The term "dripping" as used in this specification means that water drops formed by condensation on the film surface are caused to flow down without staying on said surface.

In order to prevent fog generation, Japanese Patent Publication Nos. 35573/84 and 12498/88 propose synthetic resin-made agricultural covering materials having incorporated thereinto a nonionic surfactant and a fluorine compound surfactant containing a perfluoroalkyl group or a perfluoroalkenyl group. Further, Japanese Patent Publication No. 18579/87 proposes agricultural and horticultural films having incorporated thereinto a copolymer of an unsaturated ester containing a perfluoroalkyl group having from 4 to 20 carbon atoms and other copolymerizable compound.

However, these proposals are mainly concerned with films comprising polyvinyl chloride as a base material and when applied to agricultural films comprising a polyolefin resin as a base material, they respectively involved insufficiency. That is, though the former agricultural films having incorporated thereinto a fluorine compound surfactant containing a perfluoroalkyl group or a perfluoroalkenyl group exhibit a superior fog-preventing effect, they involve such defects that no durability of the fog-preventing effect is obtained because of high hydrophilicity of the fluorine compound surfactant and in particular, in the case that the base material comprises a polyolefin resin, not only the fog-preventing effect is lost within a short period, but the durability of dripping property brought by the dripping agent used in combination is reduced. Further, in the case of using the latter copolymer oligomer of an unsaturated ester containing a perfluoroalkyl group and other copolymerizable compound, the diffusibility into the surface of the resin film is low, and an insufficient fog-preventing effect which is considered to be caused by a low surface activating ability is found.

Accordingly, an object of the present invention is to provide an agricultural film comprising a polyolefin resin as a base material and having a superior fog-preventing effect and superior durability thereof.

In order to solve the aforesaid problems, the present inventors have made extensive and intensive investigations regarding a fog-preventing agent which exhibits a superior efficacy in fog-preventing effect against polyolefin resin films and durability thereof. As a result, they have found that an $\omega$-hydroperfluoroalkyl group-containing fluorine compound surfactant is effective and then accomplished the present invention.

That is, the present invention relates to an agricultural film comprising a polyolefin resin, an $\omega$-hydroperfluoroalkyl group-containing fluorine compound surfactant, and a nonionic dripping agent. More specifically, it relates to an agricultural film comprising a polyolefin-based composition comprising 100 parts by weight of a polyolefin resin, from 0.02 to 0.5 part by weight of an $\omega$-hydroperfluoroalkyl group-containing fluorine compound surfactant, and from 0.5 to 5 parts by weight of a nonionic dripping agent.

The polyolefin resin which can be used in the present invention includes homopolymers of an $\alpha$-olefin and copolymers of different monomers composed mainly of an $\alpha$-olefin copolymers (e.g., an ethylene-propylene copolymer, an ethylene-butene-1 copolymer, an ethylene-4-methyl-1-pentene copolymer, an ethylene-hexene copolymer), an ethylene-vinyl acetate copolymer, an ethylene-acrylic acid copolymer, an ethylenemethyl methacrylate copolymer, an ethylene-vinyl acetate-methyl methacrylate copolymer, an ionomer resin, and the like.

These resins preferably have a melt flow index of from 0.3 g/10 min. to 2 g/10 min. If the melt flow index is less than 0.3 g/10 min., it is difficult to undergo film processing, whereas if the melt flow index exceeds 2 g/10 min., the film strength is undesirably reduced.

Among these resins, low-density polyethylenes having a density of not higher than 0.935, ethylene-$\alpha$-olefin copolymers, and ethylene-vinyl acetate copolymers having a vinyl acetate content of not higher than 30% by weight are preferred because they have superior transparency and flexibility and provide inexpensive films.

The $\omega$-hydroperfluoroalkyl group-containing fluorine compound surfactant (hereinafter referred to as "$\omega$-hydro type fluorine compound surfactant") which is used in the present invention refers to a usual surfactant having an $\omega$-hydroperfluoroalkyl group in the hydrophobic group moiety thereof. That is, the $\omega$-hydroperfluoroalkyl group-containing fluorine compound surfactant as referred to herein is a perfluoroalkyl group-containing fluorine compound surfactant (hereinafter referred to as "perfluoro type fluorine compound surfactant") in which one of the fluorine atoms of the trifluoromethyl group moiety in the terminal moiety ($\omega$-position) of the perfluoroalkyl group thereof is substituted with a hydrogen atom.

Examples of the hydrophilic group moiety of the $\omega$-hydro type fluorine compound surfactant used in the present invention include an anionic type having in the molecule thereof at least one anionic group such as a carboxylate group, a sulfonate group, a phosphonate group, etc.; a cationic type having in the molecule thereof at least one cationic group such as an ammonium group, a phosphonium group, etc.; an ampholytic type having in the molecule thereof at least one pair of an anionic group and a cationic group; a nonionic type having in the molecule thereof at least one hydrophilic nonionic group such as a polyethylene oxide group, a polypropylene oxide group, a polyglycerin group, a sorbitol group, etc.; and the like. In particular, the nonionic type is more preferred from the standpoint of compatibility with polyolefin resins and heat resistance.

Examples of the ω-hydro type fluorine compound surfactant which is used in the present invention include compounds having structures represented by the following formulae (I) to (VI):

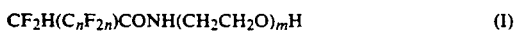
$$CF_2H(C_nF_{2n})CONH(CH_2CH_2O)_mH \qquad (I)$$

wherein n is from 4 to 11 and preferably from 5 to 9; and m is from 1 to 30 and preferably from 2 to 20.

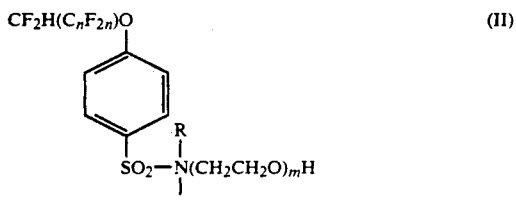

(II)

wherein R represents hydrogen or a lower alkyl group; n is from 4 to 11 and preferably from 6 to 9; and m is from 2 to 30 and preferably from 3 to 20.

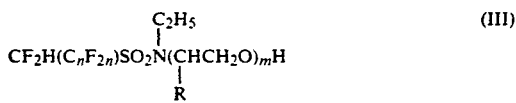

(III)

wherein R represents hydrogen or a methyl group; n is from 4 to 11 and preferably from 5 to 9; and m is from 1 to 30 and preferably from 2 to 20.

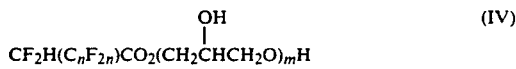

(IV)

wherein n is from 4 to 11 and preferably from 5 to 9; and m is from 1 to 30 and preferably from 2 to 20.

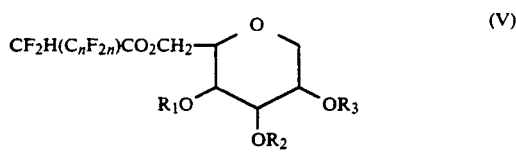

(V)

wherein $R_1$, $R_2$, and $R_3$ each represents hydrogen, a $(CH_2CH_2O)_mH$ group, or a

group; n is from 4 to 11 and preferably from 5 to 9; and m is from 1 to 20 and preferably from 1 to 10.

$$CF_2H(C_nF_{2n})CH_2CH_2O(C_2H_4O)_mR \qquad (VI)$$

wherein R represents hydrogen, an alkyl group containing from 1 to 12 carbon atoms, or a phenyl group which may be substituted with an alkyl group; n is from 4 to 11 and preferably from 5 to 9; and m is from 1 to 20 and preferably from 1 to 20.

A suitable amount of the ω-hydro type fluorine compound surfactant compound is from 0.02 to 0.5 part by weight and preferably from 0.05 to 0.2 part by weight based on 100 parts by weight of the polyolefin resin. If the amount of the ω-hydro type fluorine compound surfactant compound is less than 0.02 part by weight, a satisfactory fog-preventing effect cannot be expected, whereas if it exceeds 0.5 part by weight, increased improvement in the performance cannot be expected, leading to a disadvantage in economy.

These ω-hydro type fluorine compound surfactants can be used singly or in admixture of two or more thereof.

On the other hand, examples of the nonionic dripping agent which is used in the present invention include polyoxyethylene alkyl ethers, polyoxyethylene alkylaryl ethers, polyoxyethylene polyoxypropylene ethers, polyoxyethylene alkyl esters, partial esterification products between polyhydric alcohols and fatty acids, polyoxyethylene alkylamines, polyoxyethylene sorbitan fatty acid esters, polyoxyethylene glyceryl fatty acid esters, polyoxyethylene propylene glycol mono-fatty acid esters, and the like.

The selection of these nonionic dripping agents is carried out while taking into consideration the film-forming property, heat resistance, and transparency (film whitening caused by bleeding of the dripping agent) in addition to keeping the superior dripping property. However, from the standpoint of proper compatibility with the polyolefin resin and of compatibility with the ω-hydro type fluorine compound surfactant, partial esters between a polyhydric alcohol such as sorbitan, sorbitol, diglycerin, triglycerin, tetraglycerin, etc. and a fatty acid containing from 12 to 22 carbon atoms; and polyoxyalkylene polyhydric alcohol fatty acid esters in which the molar number of ethylene oxide or propylene oxide added is from 1 to 10, the polyhydric alcohol is sorbitan, sorbitol, diglycerin, triglycerin, or tetraglycerin, and the fatty acid contains from 12 to 22 carbon atoms can be exemplified as suitable examples of the nonionic dripping agent.

A suitable amount of the nonionic dripping agent compound is from 0.5 to 5 parts by weight and preferably from 1.5 to 3 parts by weight based on 100 parts by weight of the polyolefin resin. If the amount of the nonionic dripping agent compound is less than 0.5 part by weight, no durability of the dripping property is obtained, whereas if it exceeds 5 parts by weight, migration toward the film surface occurs to thereby undesirably fail the transparency (film whitening caused by bleeding of the dripping agent) or cause blocking to a large extent.

These nonionic dripping agents are usually used in admixture of two or more thereof in order to attain the initial dripping property and durability for a long period or take a balance in the dripping property between the cold season and the warm season.

The agricultural film of the present invention can be compounded with usually employed antioxidants, lubricants, ultraviolet light absorbers, hindered amine-based light stabilizers, pigments, etc., if desired.

The present invention will be explained in more detail by the following Examples and by referring partly to the accompanying drawing wherein FIG. 1 is a schematic view of an apparatus used for the evaluation of the thickness of fog generation and dripping property of films according to the present invention.

In the drawing, indicated with the numeral 1 is a thermostatic water vessel, 2 is a film to be tested, 3 is a chamber, 4 is a thermostatic (10° C.) air generator, 5 is a thermostatic (0° to 1° C.) air generator, 6,6 is a damper, 7 is an air duct, 8 is a photoelectric mist measuring apparatus, and 9 is a recorder (millivoltmeter).

In the present invention, the thickness of fog generation and dripping property are evaluated in the following manner.

Measurement Method for Thickness of Fog Generation

A film 2 to be tested (40×50 cm) was pitched or spread horizontally 30 cm above the surface of water of a water vessel 1 adjusted at a temperature of 30° C., and air adjusted at 10° C. was flown into a thermostatic air generator 4 from a chamber 3 faced at the external surface of the film, followed by allowing the film to stand for 24 hours. Subsequently, by switching a damper 6,6, air (generated at a thermostatic air generator 5) adjusted at 0° to 10° C. was flown into the chamber 3, and the thickness of fog generation in the vicinity of the internal surface of the film generated due to a rapid temperature change inside and outside the film was measured by means of a photoelectric mist measuring apparatus 8. The thickness of fog generation was displayed in a recorder 9 in terms of millivolt, and the higher the numerical value, the more vigorous the fog generation.

After the measurement, by again switching the damper 6,6, air adjusted at 10° C. was flown into the chamber 3, followed by keeping this state for 10 days. Thereafter, the thickness of fog generation was repeatedly carried out in the same manner as described above.

Evaluation Method for Dripping Property

The dripping state of the internal surface of the film was observed at a time other than the time for measuring the fog generation in the same testing apparatus as used in the measurement of the fog generation. The evaluation of the dripping property was made under the following criterion.
A: No small water droplet was found on the internal surface of the film.
B: A group of small water droplets was partly found on the internal surface of the film.
C: A group of small water droplets was found on the entire internal surface of the film.

EXAMPLE 1

100 parts by weight of an ethylene-vinyl acetate copolymer (EVATATE® H2021, a product of Sumitomo Chemical Company, Limited; vinyl acetate content: 15% by weight; melt index: 1.5 g/10 min.) and 1.0 part by weight of sorbitan sesquipalmitate and 0.5 part by weight of monoglycerin monostearate as nonionic dripping agents and further 0.1 part by weight of an ω-hydro type fluorine compound surfactant having a structure represented by the following formula:

were charged into a Banbury mixer, and the mixture was blended or kneaded at a temperature of 150° C. for 10 minutes and then passed through an extruder to obtain pellets of the resin composition. The resulting resin composition was molded at a temperature of 180° C. into a film having a thickness of 0.075 mm by means of a blown film forming machine.

This film was evaluated for the thickness of fog generation and dripping property by using the testing apparatus shown in FIG. 1.

The results are shown in Table 1. It can be understood that the resulting film exhibits superior fog-preventing effect and dripping property.

EXAMPLES 2 AND 3

Films were prepared and evaluated in the same manner as in Example 1, except for replacing the ω-hydro type fluorine compound surfactant used in Example 1 by each of the ω-hydro type fluorine compound surfactants shown in Table 1. The results are shown in Table 1.

EXAMPLE 4

A film was prepared and evaluated in the same manner as in Example 1, except for replacing the ethylene-vinyl acetate copolymer used in Example 1 by a low-density polyethylene (SUMIKATHENE® F208-1, a product of Sumitomo Chemical Company, Limited; density: 0.922 g/cm$^3$; melt index: 1.5 g/10 min.). The results are shown in Table 1.

EXAMPLE 5

A film was prepared and evaluated in the same manner as in Example 1, except that the ethylene-vinyl acetate copolymer used in Example 1 was replaced by a linear low-density polyethylene (SUMIKATHENE® L FA201, a product of Sumitomo Chemical Company, Limited; density: 0.920 g/cm$^3$; melt index: 2.0 g/10 min.) and that the nonionic dripping agents were replaced by 1.0 part by weight of diglycerin distearate and 0.5 part by weight of monoglycerin monostearate. The results are shown in Table 1.

EXAMPLE 6

A film was prepared and evaluated in the same manner as in Example 1, except that the amount of the ω-hydro type fluorine compound surfactant compounded was changed to 0.05 part by weight. The results are shown in Table 1.

COMPARATIVE EXAMPLES 1 TO 3

Films were prepared and evaluated in the same manner as in Example 1, except for replacing the ω-hydro type fluorine compound surfactant used in Example 1 with each of the perfluoroalkyl group-containing fluorine compound surfactants shown in Table 1. The results are shown in Table 1. It can be understood that the films of the Comparative Examples are inferior in the fog-preventing effect and durability of dripping property of the film.

COMPARATIVE EXAMPLE 4

A film was prepared and evaluated in the same manner as in Example 1, except that the amount of the ω-hydro type fluorine compound surfactant compound was changed to 0.03 part by weight. The results are shown in Table 1.

COMPARATIVE EXAMPLES 5 AND 6

Components with the compounding ratio as tabulated below were blended or kneaded at a temperature of 160° C. by means of a mixing roll while using polyvinyl chloride (SUMILIT ® SX-11F, a product of Sumitomo Chemical Company, Limited) as a base resin, and each of the mixtures was molded into a film having a thickness of 0.075 mm by means of a calendering processor. The resulting films were evaluated in the same manner as in Example 1. The results are shown in Table 1.

|  | Comp. Ex. 5 | Comp. Ex. 6 |
|---|---|---|
| Polyvinyl chloride | 100 | 100 |
| Dioctyl phthalate | 45 | 45 |
| Tricresyl phosphate | 6 | 6 |
| Epoxy resin | 1.7 | 1.7 |
| Zinc stearate | 0.8 | 0.8 |
| Calcium stearate | 0.3 | 0.3 |
| Methylenebisstearamide | 0.5 | 0.5 |
| Sorbitan sesquipalmitate | 1.0 | 1.0 |
| Monoglycerin monostearate | 0.5 | 0.5 |
| $CF_2H(C_8H_{16})CH_2CH_2O(C_2H_4O)_{10}CH_3$ | 0.1 | — |
| $CF_3(C_8H_{16})CH_2CH_2O(C_2H_4O)_{10}CH_3$ | — | 0.1 |

(weight part)

COMPARATIVE EXAMPLE 7

A film was prepared and evaluated in the same manner as in Example 1 or Comparative Example 1, except that no fluorine compound surfactant was used. The results are shown in Table 1. It can be understood that though the dripping property is good, no fog-preventing effect is found.

TABLE 1

|  | Base Resin | Nonionic Dripping Agent Type | Amount (weight part) | Fluorine Compound Surfactant Type | Amount (weight part) |
|---|---|---|---|---|---|
| Example 1 | EVA | sorbitan sesquipalmitate | 1.0 | $CF_2H(C_8F_{16})CO_2(CH_2CHCH_2O)_4H$ <br> $\mid$ <br> $OH$ | 0.1 |
| Example 2 | EVA | monoglycerin monostearate <br> sorbitan sesquipalmitate <br> monoglycerin monostearate | 0.5 <br> 1.0 <br> 0.5 | $CF_2H(C_8F_{16})CH_2CH_2O(C_2H_4O)_{10}CH_3$ | 0.1 |
| Example 3 | EVA | sorbitan sesquipalmitate <br> monoglycerin monostearate | 1.0 <br> 0.5 | $CF_2H(C_7F_{14})CONH(C_2H_4O)_9H$ | 0.1 |
| Example 4 | LDPE | sorbitan sesquipalmitate <br> monoglycerin monostearate | 1.0 <br> 0.5 | $CF_2H(C_8F_{16})CO_2(CH_2CHCH_2O)_4H$ <br> $\mid$ <br> $OH$ | 0.1 |
| Example 5 | LLDPE | diglycerin stearate | 1.0 | $CF_2H(C_8F_{16})CO_2(CH_2CHCH_2O)_4H$ <br> $\mid$ <br> $OH$ | 0.1 |
| Example 6 | EVA | monoglycerin monostearate <br> sorbitan sesquipalmitate | 0.5 <br> 1.0 | $CF_2H(C_8F_{16})CO_2(CH_2CHCH_2O)_4H$ <br> $\mid$ <br> $OH$ | 0.05 |
| Comparative Example 1 | EVA | monoglycerin monostearate <br> sorbitan sesquipalmitate | 0.5 <br> 1.0 | $CF_3(C_8F_{16})CO_2(CH_2CHCH_2O)_4H$ <br> $\mid$ <br> $OH$ | 0.1 |
| Comparative Example 2 | EVA | monoglycerin monostearate <br> sorbitan sesquipalmitate <br> monoglycerin monostearate | 0.5 <br> 1.0 <br> 0.5 | $CF_3(C_8F_{16})CH_2CH_2O(C_2H_4O)_{10}CH_3$ | 0.1 |
| Comparative Example 3 | EVA | sorbitan sesquipalmitate <br> monoglycerin monostearate | 1.0 <br> 0.5 | $CF_3(C_7F_{14})CONH(C_2H_4O)_9H$ | 0.1 |
| Comparative Example 4 | EVA | sorbitan sesquipalmitate <br> monoglycerin monstearate | 1.0 <br> 0.5 | $CF_3(C_8F_{16})CO_2(CH_2CHCH_2O)_4H$ <br> $\mid$ <br> $OH$ | 0.03 |
| Comparative Example 5 | PVC | sorbitan sesquipalmitate <br> monoglycerin monosterate | 1.0 <br> 0.5 | $CF_2H(C_8F_{16})CH_2CH_2O(C_2H_4O)_{10}CH_3$ | 0.1 |
| Comparative Example 6 | PVC | sorbitan sesquipalmitate <br> monoglycerin monostearate | 1.0 <br> 0.5 | $CF_3(C_8F_{16})CH_2CH_2O(C_2H_4O)_{10}CH_3$ | 0.1 |
| Comparative Example 7 | EVA | sorbitan sesquipalminate <br> monoglycerin monostearate | 1.0 <br> 0.5 | — | — |

|  | Thickness of Fog Generation Lapsing Time | | | | Dripping Property Lapsing Time | | | |
|---|---|---|---|---|---|---|---|---|
|  | 1 Day | 10 Days | 20 Days | 30 Days | 1 Day | 10 Days | 20 Days | 30 days |
| Example 1 | 0.2–0.4 | 0.2–0.4 | 0.2–0.3 | 0.2–0.4 | A | A | A | A |
| Example 2 | 0.2–0.4 | 0.2–0.3 | 0.2–0.3 | 0.2–0.3 | A | A | A | A |
| Example 3 | 0.2–0.3 | 0.2–0.3 | 0.2–0.3 | 0.2–0.3 | A | A | A | B |
| Example 4 | 0.2–0.4 | 0.2–0.3 | 0.2–0.3 | 0.3–0.5 | A | A | A | A |
| Example 5 | 0.2–0.4 | 0.2–0.4 | 0.2–0.4 | 0.3–0.5 | A | A | A | A |
| Example 6 | 0.3–0.4 | 0.3–0.4 | 0.3–0.4 | 0.4–0.6 | A | A | A | A |
| Comparative Example 1 | 0.2–0.3 | 0.3–0.6 | 0.8–1.6 | 1.8–3.0 | A | B | C | C |
| Comparative Example 2 | 0.4–0.6 | 0.4–0.6 | 0.8–1.2 | 1.4–2.6 | A | A | B | C |
| Comparative Example 3 | 0.4–0.6 | 0.4–0.6 | 0.8–1.4 | 1.4–2.6 | A | A | B | C |
| Comparative Example 4 | 0.9–1.4 | 0.9–1.4 | 1.2–1.6 | 1.6–2.2 | A | A | A | A |
| Comparative | 0.8–1.2 | 0.8–1.2 | 0.8–1.2 | 0.9–1.2 | A | A | B | B |

TABLE 1-continued

| | | | | | | | | |
|---|---|---|---|---|---|---|---|---|
| Example 5 Comparative Example 6 | 0.2–0.3 | 0.2–0.3 | 0.6–0.8 | 0.8–1.0 | A | A | B | C |
| Comparative Example 7 | 2.1–3.6 | 2.0–4.2 | 1.8–3.6 | 1.8–3.2 | A | A | A | A |

EVA: ethylene-vinyl acetate copolymer
LDPE: high pressure process low-density polyethylene
LLDPE: linear low-density polyethylene
PVC: polyvinyl chloride (compounded with a plasticizer)

As is clear from Table 1, the films of Examples 1 to 6 in which an ω-hydro type fluorine compound surfactant is used are found to be very superior in the fog-preventing effect and the durability of dripping property as compared with the films of Comparative Examples 1 to 3 in which a perfluoro type fluorine compound surfactant is used. While the reason for this is not always definite, it is known that when ω-hydro type and perfluoro type fluorine compound surfactants are compared, so far as an ability to lower the surface tension of water is, for example, concerned, the latter is greater in the effect than the former.

In the case that a polyolefin resin is compounded with a fluorine compound surfactant, though the ω-hydro type fluorine compound surfactant is low in the ability to lower the surface tension of water adhered to or deposited on the film surface, its degree of flowing out by the flow-down of water droplets is low and, hence, it is estimated that the fog-preventing effect and durability thereof can be obtained.

Further, with respect to the dripping property, it is considered that while the nonionic dripping agent diffuses into the film surface together with the fluorine compound surfactant and flows out by the flow-down of water droplets, in the case of the perfluoro type fluorine compound surfactant, the dripping property to which the nonionic dripping agent contributes is also adversely affected. Incidentally, in the case of the polyvinyl chloride resin film, the ω-hydro type fluorine compound surfactant is lower in the fog-preventing effect than the perfluoro type fluorine compound surfactant and, hence, it can be understood that it exhibits a difference performance from that in the case of the polyolefin resin film.

The ω-hydro type fluorine compound surfactant used in the present invention is superior in the fog-preventing effect and the durability of dripping property as compared with the perfluoro type fluorine compound surfactant and gives rise to an agricultural film having good compatibility with a polyolefin resin.

What we claim is:

1. An agricultural film of a polyolefin composition comprising from 0.02 to 0.5 part by weight of an ω-hydroperfluoroalkyl group-containing fluorine compound surfactant and from 0.5 to 5 parts by weight of a nonionic dripping agent per 100 parts by weight of a polyolefin resin.

2. The agricultural film as claimed in claim 1, wherein the polyolefin is a low density polyethylene having a density of from 0.9 g/cm$^3$ to 0.935 g/cm$^3$, or an ethylene/α-olefin copolymer.

3. The agricultural film as claimed in claim 1, wherein the polyolefin is an ethylene/vinyl acetate copolymer.

* * * * *